United States Patent
Ma et al.

(10) Patent No.: US 10,156,583 B2
(45) Date of Patent: Dec. 18, 2018

(54) METHOD OF MAKING AN ACCELEROMETER

(71) Applicant: Intel Corporation, Santa Clara, CA (US)

(72) Inventors: Qing Ma, San Jose, CA (US); Valluri Rao, Saratoga, CA (US); Feras Eid, Chandler, AZ (US); Kevin Lin, Beaverton, OR (US); Weng Hong Teh, Phoenix, AZ (US); Johanna M. Swan, Scottsdale, AZ (US); Robert L. Sankman, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 15/051,856

(22) Filed: Feb. 24, 2016

(65) Prior Publication Data
US 2016/0245841 A1    Aug. 25, 2016

Related U.S. Application Data (62) Division of application No. 13/618,003, filed on Sep. 14, 2012, now Pat. No. 9,297,824.

(51) Int. Cl.
| | |
|---|---|
| *H01F 7/06* | (2006.01) |
| *G01P 15/097* | (2006.01) |
| *G01P 15/105* | (2006.01) |
| *G01P 15/18* | (2013.01) |

(52) U.S. Cl.
CPC ......... *G01P 15/097* (2013.01); *G01P 15/105* (2013.01); *G01P 15/18* (2013.01)

(58) Field of Classification Search
CPC .... G01P 15/082; G01P 15/097; G01P 15/105; G01P 15/11; G01P 15/18
See application file for complete search history.

(56) References Cited

U.S. PATENT DOCUMENTS

| | | | |
|---|---|---|---|
| 4,498,341 A | 2/1985 | Breitbach et al. | |
| 4,967,598 A | 11/1990 | Wakatsuki et al. | |
| 5,442,288 A | 8/1995 | Fenn et al. | |
| 5,488,862 A | 2/1996 | Neukermans et al. | |
| 5,591,910 A * | 1/1997 | Lin ..................... | G01P 15/125 |
| | | | 200/61.45 R |
| 5,693,883 A | 12/1997 | Giroud et al. | |
| 5,763,783 A | 6/1998 | Asada | |
| 6,044,705 A | 4/2000 | Neukermans et al. | |

(Continued)

OTHER PUBLICATIONS

"U.S. Appl. No. 13/618,003, Advisory Action dated Sep. 9, 2015", 3 pgs.

(Continued)

*Primary Examiner* — Paul D Kim
(74) *Attorney, Agent, or Firm* — Schwegman Lundberg & Woessner, P.A.

(57) ABSTRACT

A method of manufacturing an accelerometer, including placing a magnet on a substrate, laminating a dielectric layer over the magnet, forming a conductive layer over the dielectric layer, the conductive layer including a mass and a conductive path overlying the magnet, removing a portion of the dielectric layer proximate the mass and conductive path such that the mass is movable in response to acceleration of the accelerometer, and forming a dielectric layer over the mass to form a space between the mass and the dielectric layer formed over the mass sufficiently clear such that the mass remains movable.

5 Claims, 10 Drawing Sheets

(56) References Cited

U.S. PATENT DOCUMENTS

| | | | |
|---|---|---|---|
| 6,119,520 A * | 9/2000 | Woodruff | B81B 3/0081 |
| | | | 438/52 |
| 6,131,457 A | 10/2000 | Sato | |
| 6,311,557 B1 | 11/2001 | Davis et al. | |
| 6,631,643 B2 | 10/2003 | Malvern et al. | |
| 6,668,627 B2 | 12/2003 | Lange et al. | |
| 7,180,019 B1 * | 2/2007 | Chiou | G01P 15/0891 |
| | | | 200/61.45 M |
| 7,219,549 B2 | 5/2007 | Honkura et al. | |
| 7,350,424 B2 * | 4/2008 | Hjelt | G01P 15/06 |
| | | | 200/61.08 |
| 7,621,185 B2 | 11/2009 | Kasajima | |
| 7,886,600 B2 | 2/2011 | Honkura et al. | |
| 9,297,824 B2 | 3/2016 | Ma et al. | |
| 9,502,993 B2 * | 11/2016 | Deng | G01H 11/08 |
| 2004/0121504 A1 * | 6/2004 | Zerbini | G01P 1/023 |
| | | | 438/48 |
| 2007/0209437 A1 | 9/2007 | Xue et al. | |
| 2012/0240679 A1 * | 9/2012 | Netzer | G01P 15/125 |
| | | | 73/514.32 |
| 2012/0312097 A1 | 12/2012 | Koyama et al. | |

OTHER PUBLICATIONS

"U.S. Appl. No. 13/618,003, Advisory Action dated Sep. 30, 2015", 3 pgs.

"U.S. Appl. No. 13/618,003, Final Office Action dated Jun. 24, 2015", 11 pgs.

"U.S. Appl. No. 13/618,003, Non Final Office Action dated Feb. 24, 2015", 15 pgs.

"U.S. Appl. No. 13/618,003, Notice of Allowance dated Dec. 8, 2015", 7 pgs.

"U.S. Appl. No. 13/618,003, Response filed Jan. 13, 2015 to Restriction Requirement dated Nov. 14, 2014", 1 pg.

"U.S. Appl. No. 13/618,003, Response filed May 26, 2015 to Non Final Office Action dated Feb. 24, 2015", 12 pgs.

"U.S. Appl. No. 13/618,003, Response filed Aug. 24, 2015 to Final Office Action dated Jun. 24, 2015", 9 pgs.

"U.S. Appl. No. 13/618,003, Response filed Sep. 11, 2015 to Advisory Action dated Sep. 9, 2015", 2 pgs.

"U.S. Appl. No. 13/618,003, Restriction Requirement dated Nov. 14, 2014", 7 pgs.

* cited by examiner

FIG. 1A (top view)

METHOD OF MAKING AN ACCELEROMETER

CROSS-REFERENCE TO RELATED APPLICATIONS

This present application is a divisional of U.S. patent application Ser. No. 13/618,003, filed on Sep. 14, 2012, now U.S. Pat. No. 9,297,824, the entire contents of the application is incorporated herein by reference.

FIELD

This disclosure relates generally to metrology devices and more particularly to accelerometers.

BACKGROUND

Recent advancements in the field of micro-electrical mechanical systems (MEMS) technologies have made it possible to integrate microlevel electromechanical components, such as microsensors and microactuators, into many electronic devices.

Moreover, handheld electronic devices often employ accelerometers to provide orientation and acceleration information. These handheld electronic devices include, for example, mobile phones, game controllers, handheld computing devices, tablet computers, mobile devices, digital cameras, navigations systems, and the like, that use the orientation and/or acceleration information to improve user interaction as well as provide data to a wide variety of applications, such as health monitoring and context-aware applications.

DETAILED DESCRIPTION

In the description that follows, to illustrate one or more aspect(s) of the present disclosure in a clear and concise manner, the drawings may not necessarily be to scale and certain features may be shown in somewhat schematic form. Features that are described and/or illustrated with respect to one aspect may be used in the same way or in a similar way in one or more other aspects and/or in combination with or instead of the features of the other aspects of the technology disclosed herein.

An accelerometer in accordance with an embodiment includes a mass, suspended by a beam that includes a pair of separate conductive paths and a pair of magnets. Each magnet is associated with a respective one of the conductive paths, such that, when a time varying signal is applied to the conductive paths, a characteristic resonant frequency is produced, and when the proof experiences an acceleration, a respective change in the resonant frequency is produced, a change in resonant frequency in a first of the conductive paths being different from a change in resonant frequency in a second of the conductive paths in one or both of magnitude and direction.

In an embodiment, an accelerometer includes a mass, suspended by one or more beams each including a pair of conductive paths and a magnetic field created by one or more permanent magnets or electromagnets. When a time varying signal is applied to the conductive paths, a characteristic resonant frequency is produced, and when the proof mass experiences an acceleration, a respective change in the resonant frequency is produced.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Figure 1A:
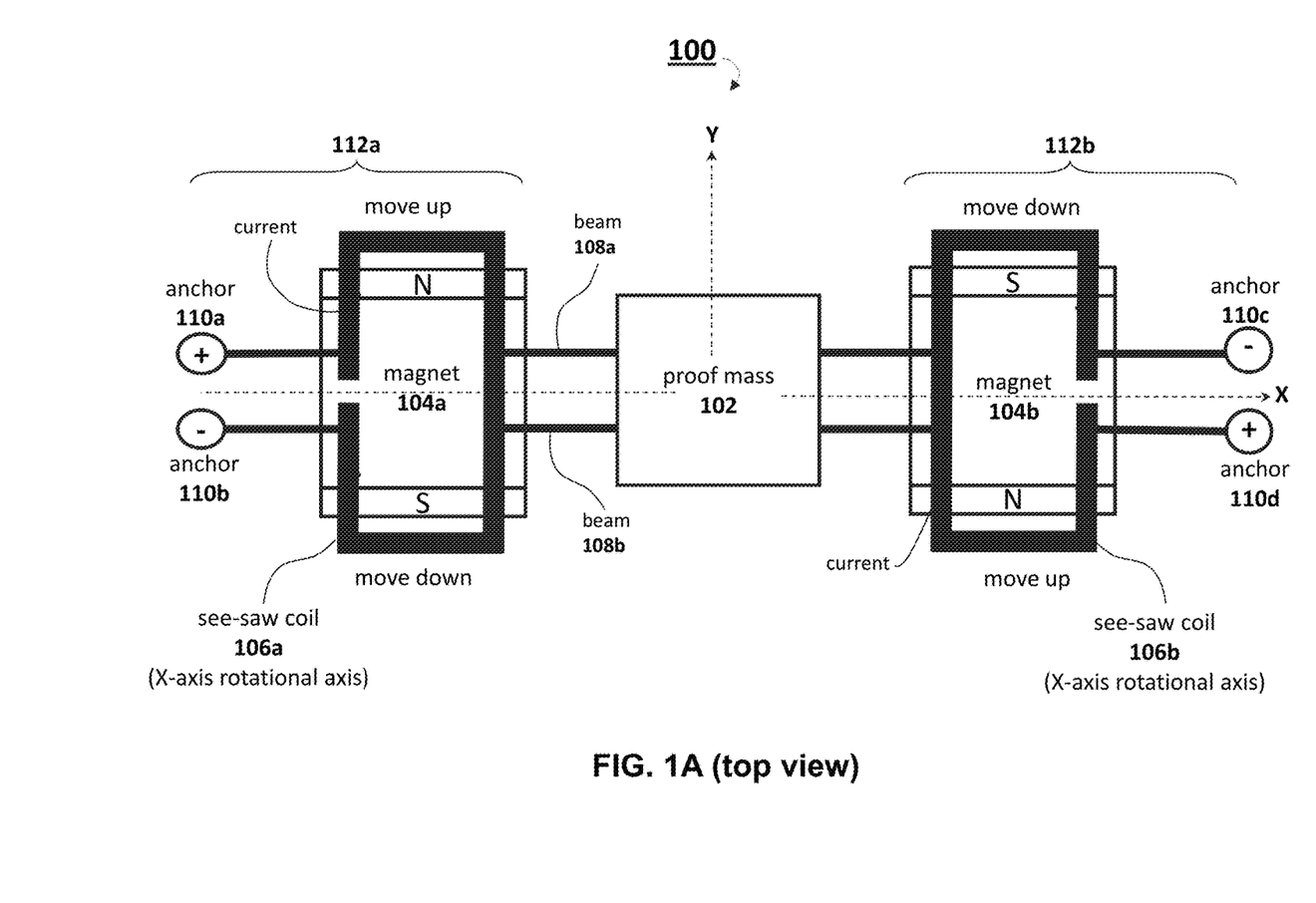
FIG. 1A is a schematic diagram of a resonant accelerometer in accordance with an embodiment.

Turning now to the various aspects of the disclosure, FIG. 1a depicts a top view of an embodiment of accelerometer 100. A proof mass 102 that acts as the inertial mass of the accelerometer is suspended above and between a pair of magnets 104a, 104b that underlie respective coils 106a, 106b. Each coil 106a, 106b is configured to accommodate a see-saw movement about an axis X. The coils 106a, 106b are supported by a pair of beams 108a, 108b.

The beams are anchored at their ends by anchors 110a, 110b, 110c and 110d. The anchors, in addition to providing mechanical support to the beams 108a, 108b, may provide electrical connectivity for the accelerometer circuit. Together, coil 106a and its respective components, anchors 110a, 110b, and magnet 104a form a first detector arm 112a. Likewise, coil 106b, anchors 110c, 110d and magnet 104b form a second detector arm 112b.

Figure 1B:
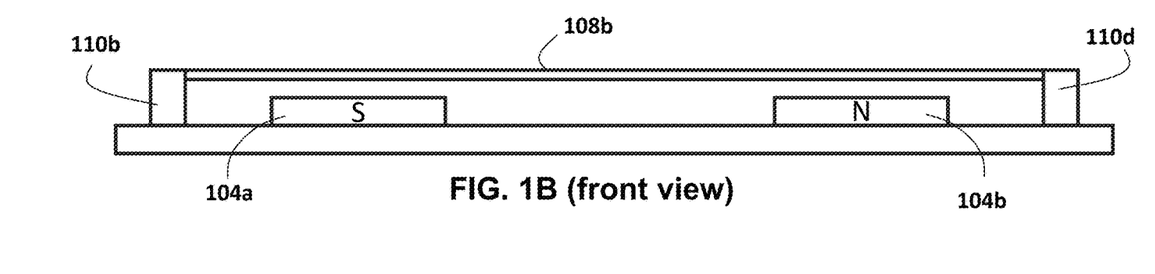
FIG. 1B is a schematic front plan view of a resonant accelerometer in accordance with an embodiment.

FIG. 1B is a front view of accelerometer 100, illustrating the profile of the magnets 104a, 104b and their relationship with the beam 108b (108a not being visible in this view). As will be appreciated, the distances illustrated and thicknesses are not necessarily to scale. In embodiments, the magnets may be between approximately 100-300 μm thick, and between about 100 and 1000 μm in the X and Y dimensions. As an example, they may be made from a samarium-cobalt alloy. Neodymium iron boron magnets may similarly find application in embodiments. Typical magnetic field strengths may be in the range of 0.1-0.4 T.

The beams may be between about 2 and 20 μm thick, 4-30 μm wide and 200-1000 μm long. The proof mass may be in the range of 20-400 μg. The distance between the magnet and the overlying beam may be between about 5 and 50 μm. Driving currents for the circuit may be in the range of 1-20 mA. As will be appreciated, these dimensions may be varied, and the resulting characteristic vibration frequency will depend on the particular design choices.

Figure 1C:
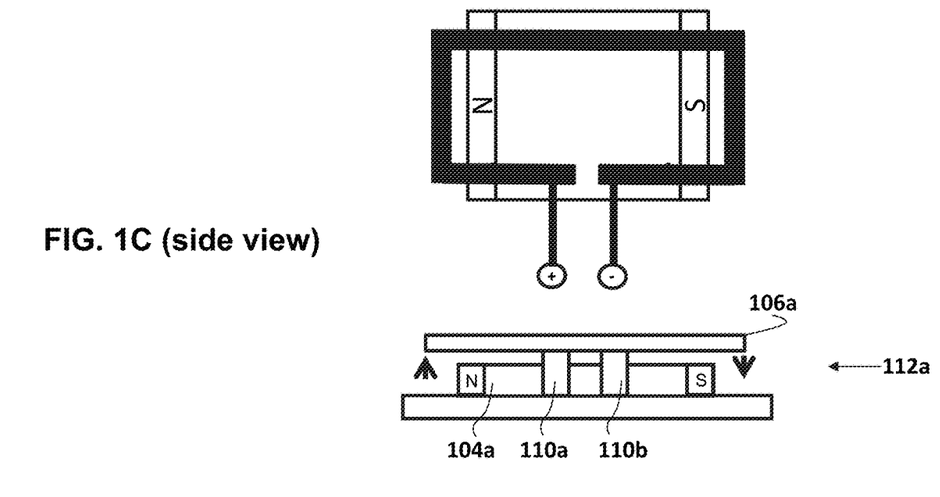
FIG. 1C is a schematic side plan view of a resonant accelerometer in accordance with an embodiment.

FIG. 1C depicts a side view of an isolated detector arm 112a, showing the magnet 104a, the anchors 110a, 110b, and the coil 106a. Arrows at either end illustrate a possible movement of the coil with a right side of the coil 106a moving downward while a left side moves upward.

In operation, as proof mass 102 undergoes accelerations due to motions of a device in which the accelerometer is embedded, the resonance frequency will change. In particular, as the proof mass 102 is accelerated in the Y or Z directions, a tension will be induced in the beams 108a, 108b, changing their elastic behavior. Acceleration in X will tend to have some effect, but because X acceleration tends to produce tension in half of the beam and compression in the other half (e.g., tension in arm 112a, compression in arm 112b), the effect is relatively smaller compared to acceleration in the Y or Z directions. As discussed below, a pair of perpendicular sensors can be used together to distinguish X or Y from the Z component, and the combined sensor information may give a direction (+/−) for Z.

If the proof mass moves in the Y direction, both arms 112a, 112b, will exhibit an increased resonance frequency, as both will be under tension. The change in resonance frequency can be correlated to a magnitude of acceleration. In practice and depending on the application, change in resonance frequency can be used directly as a value for acceleration, or a correlation can be set up, either using a look up table, or any other appropriate calibration technique. As will be appreciated, the specific change in frequency will depend on the structural features of the device, including the beam width, thickness, and length, and proof mass value as well as the measured acceleration.

Figure 2:
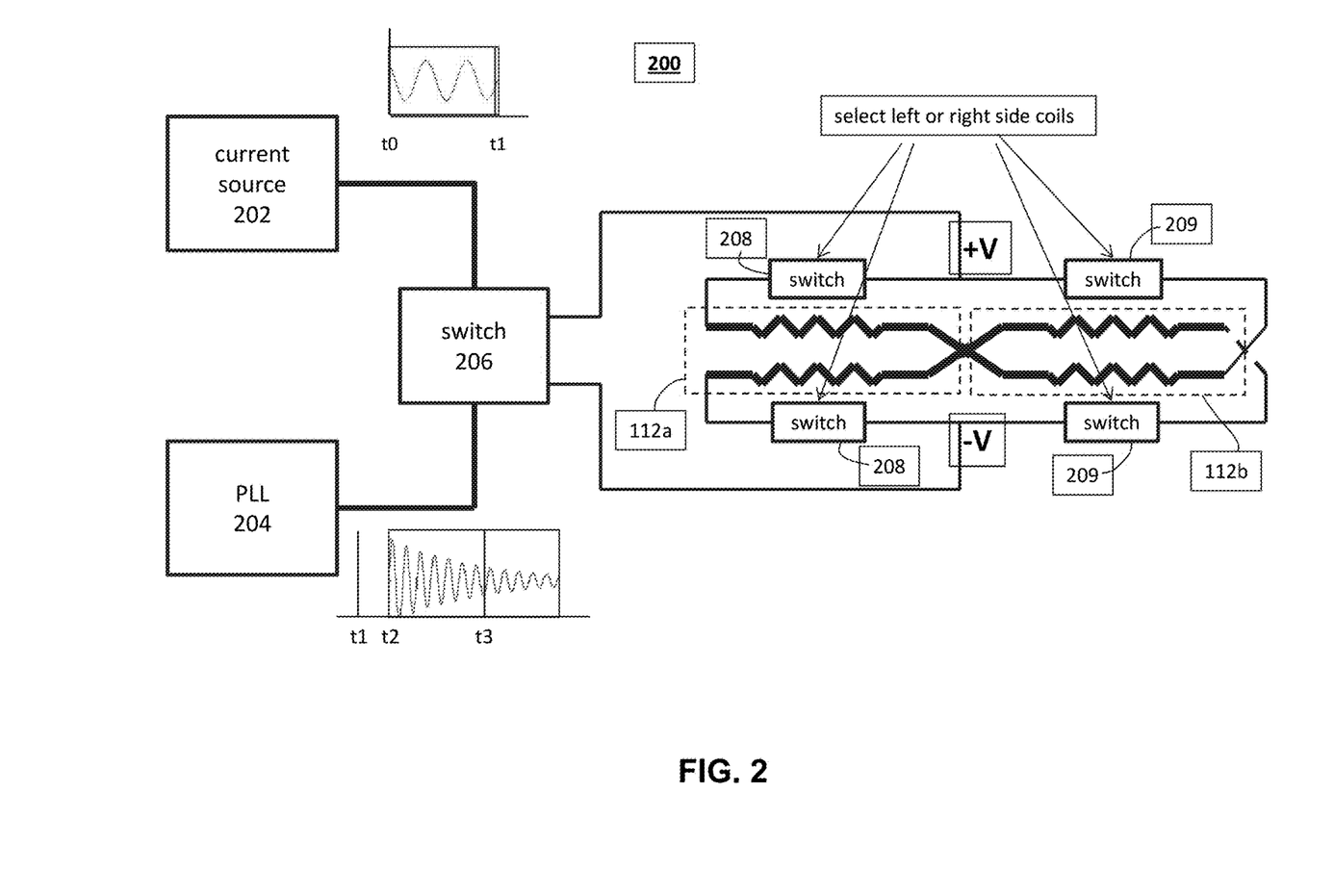
FIG. 2 is a schematic diagram of a resonant accelerometer and associated control circuitry in accordance with an embodiment.

FIG. 2 schematically illustrates circuit 200 that measures acceleration employing an embodiment of accelerometer 100, in accordance with the embodiment illustrated in FIG. 1. In this embodiment, each arm 112a, 112b may be excited, for example by an impulse of current, such that they have a see-saw vibration about the x-axis (shown in FIG. 1) with a resonance frequency, $f_0$. A current source 202 provides the impulse and a phase locked loop (PLL) circuit 204 measures a frequency of vibration of the coils. The resonant frequency is shown as a sinusoid at a frequency $f_0$ between time intervals $t_0$ and $t_1$ in FIG. 2. After an acceleration at $t_2$, the frequency changes as described above. The settling time needed to reach the new resonance frequency is shown as the time interval between $t_3$ and $t_2$.

A switch 206 allows switching between the excitation current and the measurement arm. Optionally, switches 208, 209 may be included to allow selection of one or the other of the measurement arms. In the embodiment shown, each arm has a respective pair of switches 208, 209. The switches 208, 209 may be individually operable, or may optionally be linked such that both switches for each arm are turned on or off together. In an embodiment, the switch is periodically operated so that the accelerometer samples at intervals.

In the circuit illustrated in FIG. 2, it is possible to operate both coils at the same time, or to select the coil on the left side or on the right, using the four switches 208, 209. One possibility with this arrangement is to allow for a somewhat higher sampling rate as one coil may be settling while the other coil is read.

In general, the two left switches 208 would be operated together and the two right switches 209 would be likewise operated together. Each pair may be controlled with a common signal, or may be individually controlled. As will be appreciated, it may, in principle, be possible to replace each pair of switches with a single switch, though it may generally be simpler to produce them in a paired arrangement as shown.

In an embodiment, the pulse time may be on the order of a few to tens of milliseconds. In particular, the pulse ($t_1-t_0$) may be between about 5 ms and about 20 ms. The detection time may be a few hundred microseconds. Thus, the total time for excitation and detection is <20 ms in this embodiment. Given that general time frame, it is possible to sample at a rate on the order of every 40 ms using a duty cycle of <50%. This duty cycle should provide sufficient settling time to provide accurate measurement. The inventors have determined that for typical consumer products, where accelerometer readings are not mission-critical, sampling every 40 ms is sufficient. As will be appreciated, a slight increase in speed from a 40 ms sampling time allows for sampling at a rate on the order of the 30 frame per second rate which may be typical in a video game or similar application.

Figure 3:
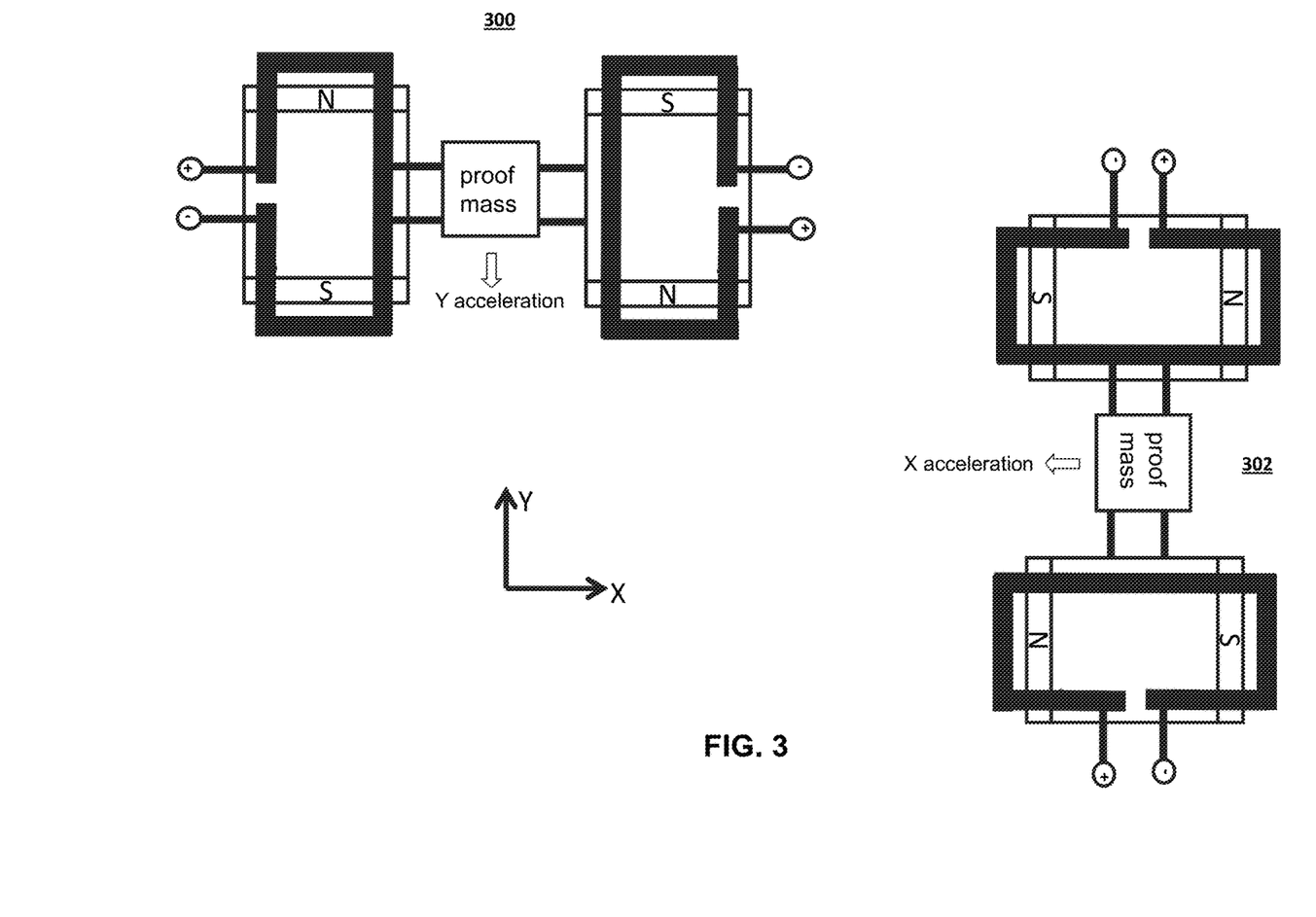
FIG. 3 is a schematic diagram of a pair of resonant accelerometers in accordance with an embodiment.

FIG. 3 illustrates a pair of perpendicularly arrayed accelerometers 300, 302, in accordance with an embodiment. With the depicted arrangement, the pair of perpendicularly arrayed accelerometers 300, 302 may be used to provide two dimensional acceleration measurements. The first accelerometer 300 may be configured to be most sensitive to acceleration along the Y and Z directions, while the second accelerometer 302 may be configured to be most sensitive to acceleration along the X and Z directions. The combined system may be used to measure Z. In this regard, it is possible to use an average Z value based on the two accelerometers, or one or the other may be selected for Z measurement.

In one approach, the first accelerometer, 300 is used to measure the magnitude of Y and Z direction accelerations and the second accelerometer 302 is used to determine the direction (i.e., positive or negative) of the X acceleration. An asymmetric seesaw structure (as described below and shown in FIG. 4) is used to determine a direction of the Z acceleration.

Alternately, the second accelerometer 302 may be used to measure the magnitude of X and Z direction accelerations while the first accelerometer 300 is used to determine a direction of the Y acceleration and an asymmetric seesaw structure is used to determine a direction of the Z acceleration.

Figure 4:
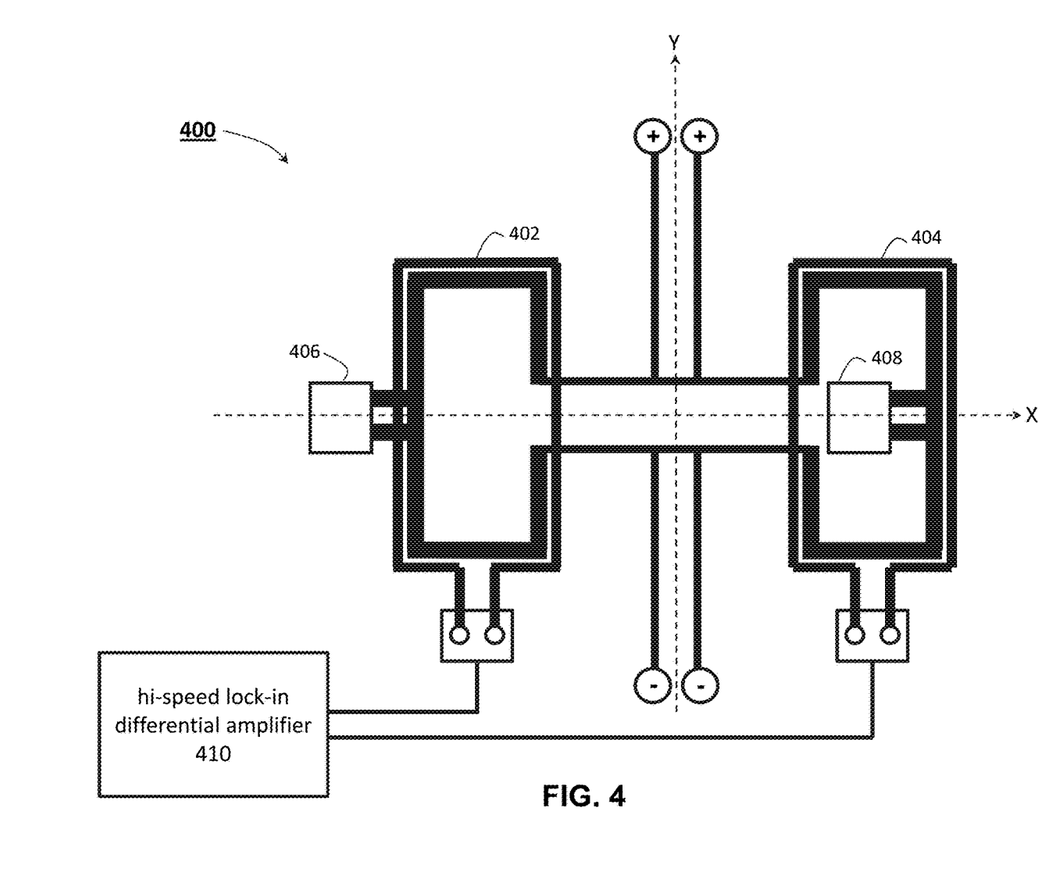
FIG. 4 is a schematic diagram of an asymmetric resonant accelerometer in accordance with an embodiment.

FIG. 4 illustrates an asymmetric see-saw arrangement 400, in accordance with an embodiment. With this arrangement, each arm 402, 404 includes its own respective proof mass 406, 408, which are each offset with respect to their associated coils. A differential amplifier 410, which may be a high speed lock-in differential amplifier, produces a signal representative of differences between the two arms.

As a result of the structure of the coils and masses, a moment of inertia of each arm should be substantially identical about the X axis. When the masses are equal, the asymmetry will cause the coil 402 to have a larger moment of inertia than coil 404 about the Y axis.

When the device is accelerated in the Z direction (perpendicular to the plane of the device), the left coil 402 is pulled downward and the right coil 404 is pushed upward. When the device is accelerated in the negative Z direction, this relationship is reversed. If an AC current is applied to the two coils, the left coil will generate a different induced voltage than the right side coil and the output of the differential amplifier 410 will provide information about the direction of acceleration.

Figure 5:
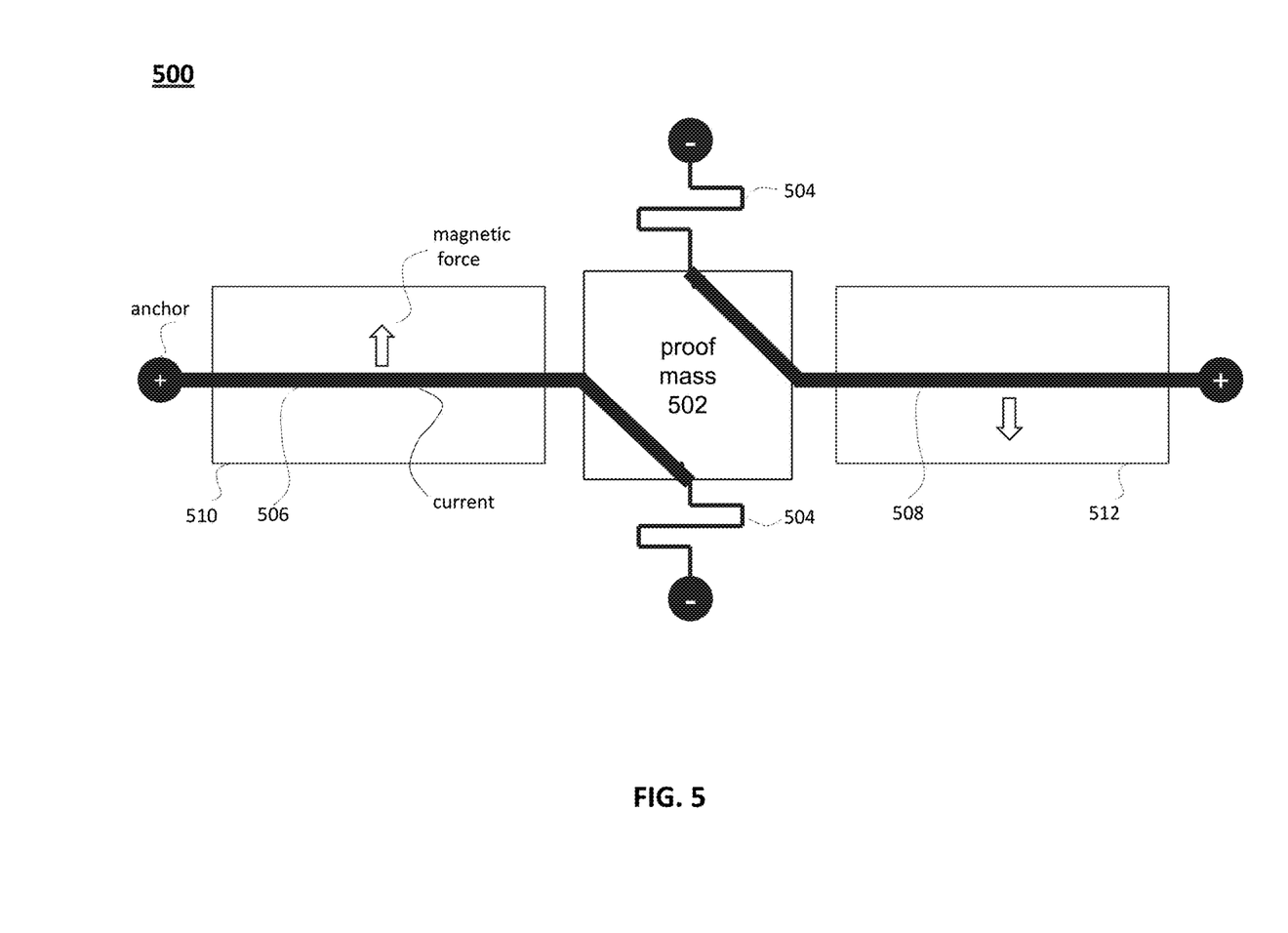
FIG. 5 is a schematic diagram of a resonant accelerometer in accordance with an embodiment.

FIG. 5 illustrates an embodiment of an accelerometer 500 in which the proof mass 502 is communicated to and supported via a pair of compliant springs 504. The springs 504 tend to level the proof mass. In this approach, the springs 504 may be manufactured from a same metal layer as the beam, in which case they may be used (as illustrated) as a portion of the current flow path. A pair of current paths 506, 508 electrically communicate the driving signal for this embodiment. The AC driving current, in conjunction with magnets 510, 512, produces magnetic forces in the directions indicated in the figure by arrows.

Accelerometers in accordance with the foregoing embodiments may be constructed to have sensitivities on the order of 0.07 g using beam thicknesses on the order of 10 μm. For smaller structures (e.g., 5 μm thicknesses) an increase in sensitivity will result.

FIGS. 6A-6J illustrate a process for manufacturing an accelerometer in accordance with an embodiment. In principle, the illustrated layering may be varied. For example, additional layers may be interspersed, containing dielectrics, functional layers, or other components for other microelectronic devices present on the common substrate. Likewise, certain of the illustrated layers (for example layers underlying the accelerometer components) may or may not be present in a device that is nonetheless in accordance with embodiments.

Figure 6A:
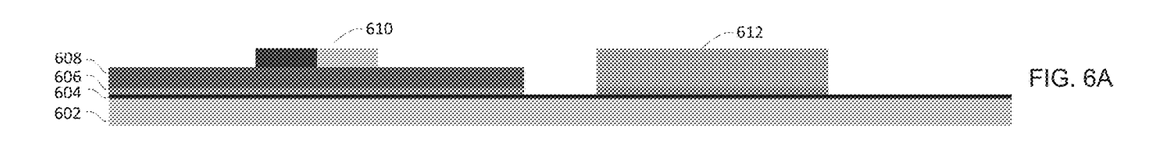
FIGS. 6A-6J schematically illustrate a process for fabrication of an accelerometer system in accordance with an embodiment.

FIG. 6A shows a substrate 602 on which the device is supported, which may be a copper plate or other substrate including, without limitation, glass or organic material. For use in bumpless build up layer (BBUL) applications, any substrate suitable for use in that technology may be used. A thin metal layer 604 overlies the substrate. A dielectric adhesive layer 606 is formed over the layer 604. A thin substrate layer 608 is optionally placed over the dielectric layer 606. This layer can provide a relatively rigid substrate for the magnet 610, but is not necessarily required. The magnet 610 is pick placed onto the adhesive layer 606. Similarly, a die 612 is optionally pick placed in the adhesive proximate the magnet. This die 612 may include the control circuitry such as the current source, switch, phase locked loop, differential amplifier and/or other related circuitry for controlling and interrogating the accelerometer. As will be appreciated, the die 612 may include all or none of these circuits, and may include other circuits for performing other functions.

It will be appreciated that, in a system on a chip embodiment, the die may include a processor, memory, communications circuitry and the like. Though a single die is illustrated, there may be none, one or several dies included in the same region of the wafer.

Figure 6B:
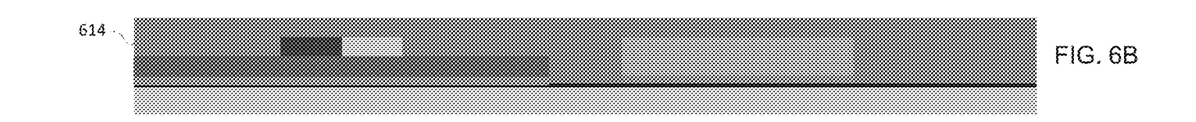
Figure 6C:
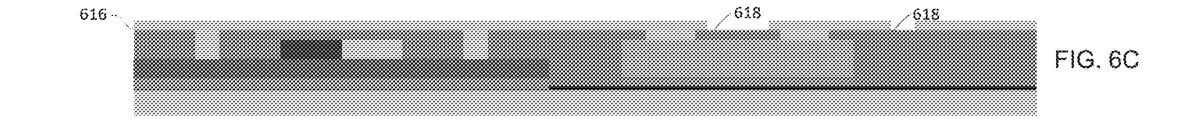

A dielectric layer 614 is deposited over the magnet 610 and die 612 as illustrated in FIG. 6B, by lamination of a dry film, for example and may be substantially planarized by compression. This layer may be, for example, an organic dielectric film. Over the dielectric layer 614, a conducting trace layer 616 is deposited. In an embodiment, this trace layer 616 will embody the coils for the see-saw accelerometer, as well as the beam and other conductive elements of the device. As will be appreciated, this layer will generally be a metallic layer, but may be any conducting material. It may be sputtered or plated using a semi-additive process, for example. Via holes 618 may be drilled or otherwise fabricated in the trace layer 616 as shown in FIG. 6C.

Figure 6D:
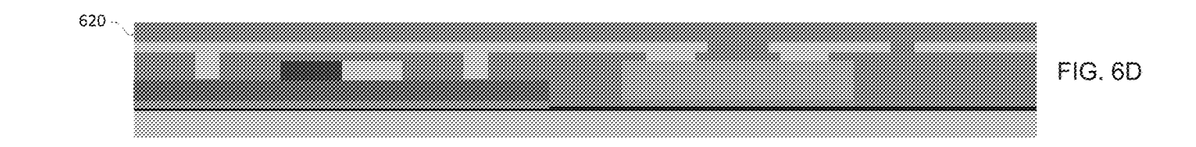
Figure 6E:
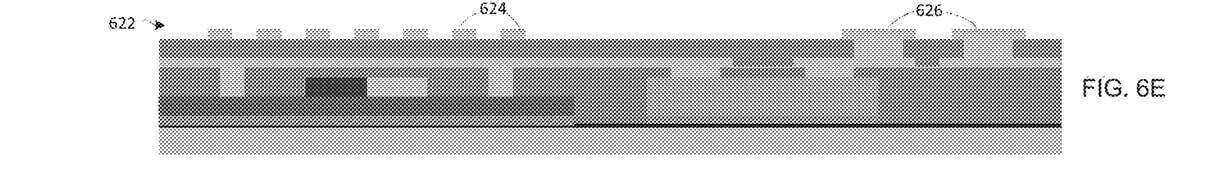

An additional dielectric layer 620 is laminated over the trace layer 616, as shown in FIG. 6D, similarly to layer 614. A metal layer 622, including, for example, a plate protection mesh 624 and electrical contacts 626 is deposited over the dielectric layer 620 (FIG. 6E). Generally, the plate protection mesh should be anchored to underlying structures at several locations (not shown) not occupied by the accelerometer structure.

Figures 6F, 6G:
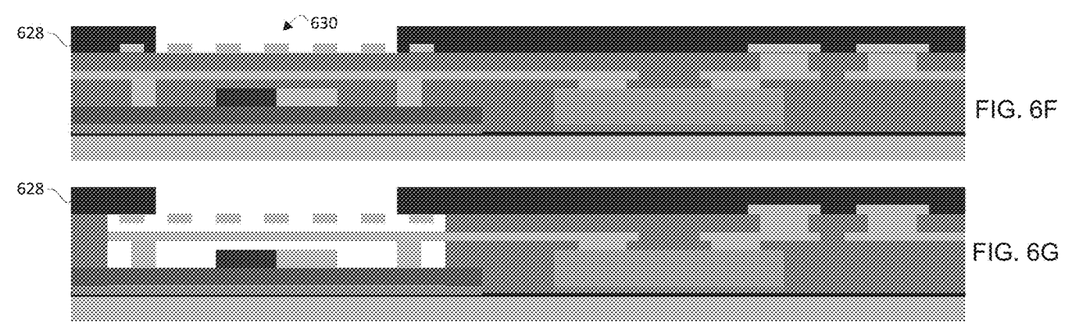

A layer of photoresist 628 is applied, for example by spin coating (FIG. 6F). A region 630 overlying the accelerometer structure is either kept clear of photoresist, or that portion of the photoresist is removed, providing access to the mesh 624 and the accelerometer structure, while the remainder of the wafer is protected.

Portions of the nonfunctional dielectric layers 614 and 620 are etched or otherwise processed to remove them such that the coil and beam may freely vibrate as described above (FIG. 6G). In an embodiment, an oxygen plasma method is used, though other approaches to material removal may be used.

Figure 6H:
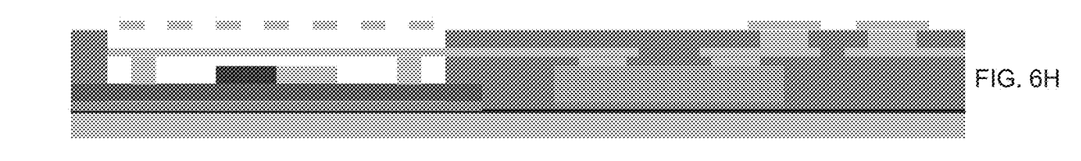
Figure 6I:
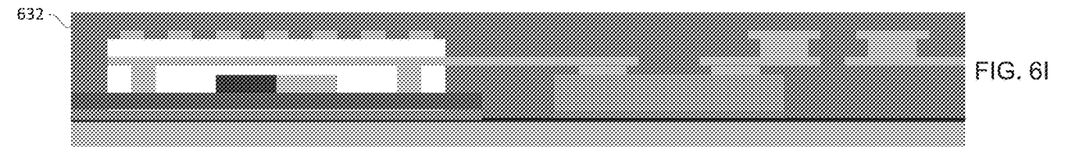
Figure 6J:
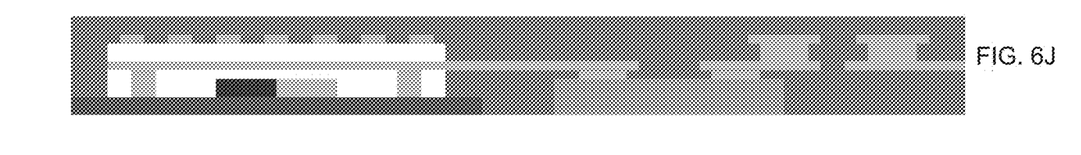

The photoresist layer 628 is removed, for example by a resist stripping process. A wet chemical process may be used, or alternately, a dry process such as a plasma stripping process may be used (FIG. 6H). The resulting package is then re-covered with another laminate organic layer (or other suitable dielectric layer) 632, completing the packaging (FIG. 6I). In this operation, the plate protection mesh 624 protects and separates the active portions of the accelerometer from the laminate layer. Finally, the copper substrate 602 is removed.

Figure 7:
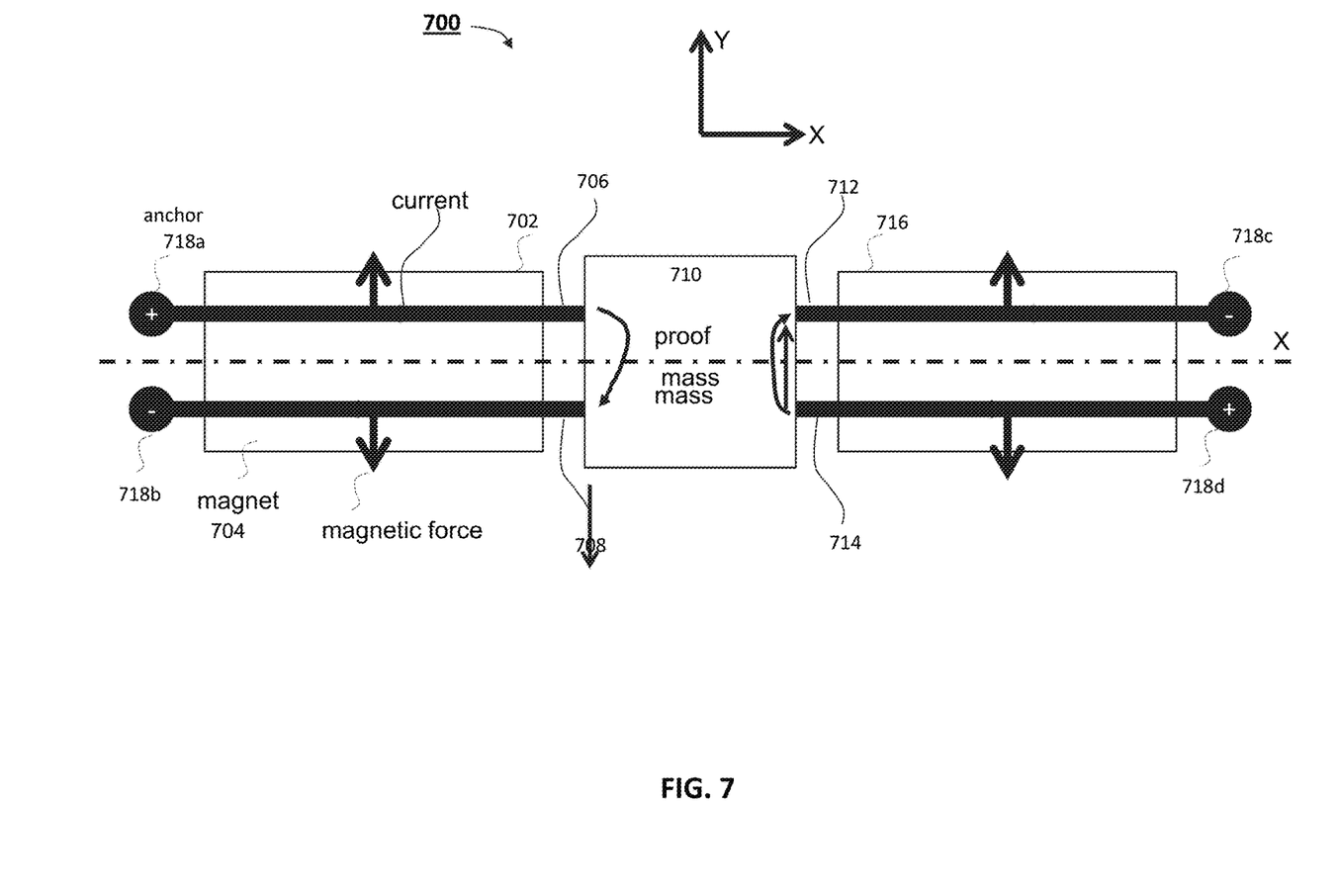
FIG. 7 is a schematic diagram of an accelerometer in accordance with an embodiment.

FIG. 7 illustrates an embodiment of an accelerometer 700 in which a magnet 704 and associated beams 706, 708 interact to form a first measurement arm, a portion of the conductive path for the first measurement arm being an edge portion of the proof mass 710. The second measurement arm includes beams 712 and 714 and magnet 716. The four beams are supported by respective anchors 718a-d. In this embodiment, as a current is applied to the beams, magnetic force is generated in the lateral direction (shown by the arrows), as in the embodiment of FIG. 5.

Figure 8:
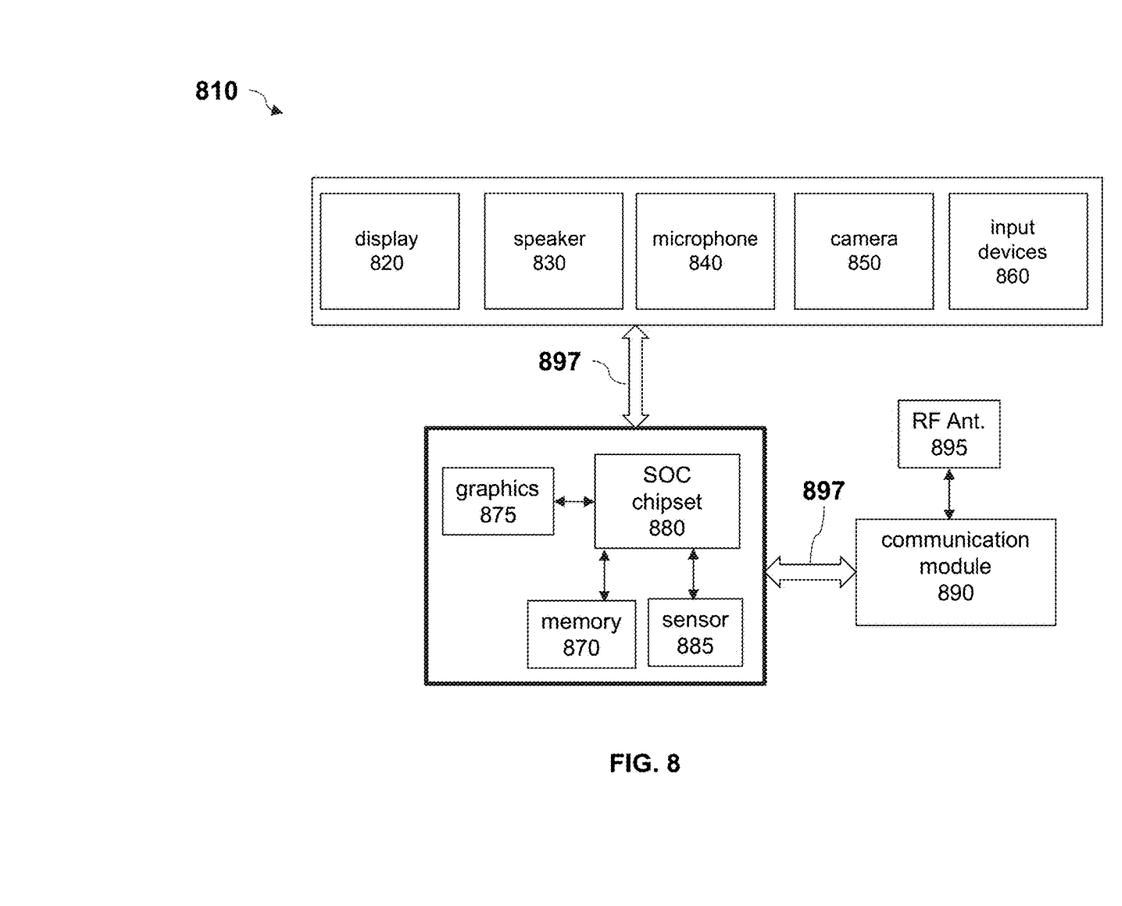
FIG. 8 is a schematic diagram of a generic device that may incorporate sensors in accordance with embodiments.

FIG. 8 depicts a generic device or system within, or in association with, which one or more embodiments may be implemented. In some embodiments, the generic device or system, which is illustrated using a block diagram in FIG. 8, may comprise a portable or hand-held electronic and/or computing device. Such electronic and/or computing devices may include laptops, mobile devices, smartphones, gaming devices, tablet computers, networking devices, and/or other devices. In the illustrative example, device or system 810 includes a display device 820, a speaker 830, a microphone 840, a camera 850, input devices 860, a memory 870, graphics processor 875, a system-on-chip (SoC) chipset 880, an accelerometer 885 in accordance with various of the foregoing embodiments, a communication module 890, and an antenna 895. Device 810 may also include a bus 897 and/or other interconnection means to connect and communicate information between various components of device 810.

In some embodiments, display device 820 is configured to display information to a user and may comprise a liquid crystal display (LCD), a light emitting diode (LED)-based display, or any other flat panel display, or may use a cathode ray tube (CRT). Speaker 830, microphone 840 and camera 850 are configured to create, capture, and output audio and visual content, which may be processed by one or more processors (e.g., within SoC 880) and stored in a storage device associated with device 810. Input devices 860 may include alphanumeric and other keys which may be inputted via a keyboard, touch screen or other comparable input mechanism. Microphone 840 and camera 850 may be configured to receive input (information, command selections, etc.) from a user or another associated device or system. The input information received through one or more input devices 860 may be communicated to a processor of SoC 880, e.g., via bus 897, for further processing. Another type of input device 860 may include a cursor control device, such as a mouse, a trackball, or cursor direction keys to communicate direction information and command selections, e.g., to SoC 880 and to control cursor movement on display device 820.

Memory 870 of device 810 may be a dynamic storage device coupled to bus 897, and configured to store information and instructions to be executed by processors of SoC 880 and/or other processors (or computing units) associated with device 810. Memory 870 may also be used to store temporary variables or other intermediate information during execution of instructions by the processors. Some or all of memory 870 may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Device 810 may also include read only memory (ROM) and/or other static storage device 872 coupled to bus 897 and configured to store static information and instructions for processors of SoC 880 and/or other processors (or computing units) associated with device 810. Further, data storage device 875 of device 810 may include a magnetic disk, optical disc or flash memory devices, and may be coupled to bus 897 to store information and instructions.

In some embodiments, SoC 880 is part of a core processing or computing unit of device 810, and is configured to receive and process input data and instructions, provide output and/or control other components of device 810 in accordance with embodiments. SoC 880 may include a microprocessor, a memory controller, a memory and peripheral components. The microprocessor may further include a cache memory (e.g., SRAM), which along with the memory of SoC 880 may be part of a memory hierarchy to store instructions and data. The microprocessor may also include one or more logic modules such as a field programmable gate array (FPGA) or other logic array. Communication between a microprocessor of the SoC 880 and memory may be facilitated by the memory controller (or chipset), which may also facilitate in communicating with the peripheral components, such as counter-timers, real-time timers and power-on reset generators. SoC 880 may also include other components including, but not limited to, timing sources (e.g., oscillators and phase-locked loops), voltage regulators, and power management circuits.

In some embodiments, device 810 is configured to communicate with other devices or systems directly or via one or more networks using communication module 890. Communication module 890 may include necessary and typical hardware, software and/or firmware modules, e.g., related to a modulator, a demodulator, a baseband converter, a channel codec, and/or other components, implemented therein to enable device 810 for wireless communication. As such, communication module 890 is able to wirelessly transmit and receive data and messages in form of radio frequency (RF) signals through antenna 795. In some embodiments, communication module 890 is designed and configured to support communication based on one or more communication standards and protocols including, but not limited to, Wi-Fi, Wi-Gi, Bluetooth, GSM, CDMA, GPRS, 3G or 4G (e.g., WiMAX, LTE) cellular standards, Wireless USB, satellite communication, and Wireless LAN. Additionally, or alternatively, communication module 890 may also be configured for wired communication, e.g., based on the Ethernet standard, and as such, may be coupled to an appropriate network interface of device 810.

Accelerometers as described herein may be manufactured as part of a chip scale packaging approach including, but not limited to, bumpless build up layer packaging technology.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method of manufacturing an accelerometer, comprising:
   placing a magnet on a substrate;
   laminating a dielectric layer over the magnet;
   forming a conductive layer over the dielectric layer, the conductive layer including a mass and a conductive path overlying the magnet;
   removing a portion of the dielectric layer proximate the mass and the conductive path such that the mass is movable in response to acceleration of the accelerometer; and
   forming a dielectric layer over the mass to form a space between the mass and the dielectric layer formed over the mass sufficiently clear such that the mass remains movable.

2. The method of claim 1, further comprising, before the removing:
   providing an additional dielectric layer over the conductive layer; and
   forming a plate protection mesh over the additional dielectric layer.

3. The method of claim 2, further comprising:
   providing a photoresist layer over the plate protection mesh prior to the removing, the photoresist layer having an opening over the plate protection mesh.

4. The method of claim 3, further comprising removing the photoresist layer after the removing the portion of the dielectric layer and before the forming the dielectric layer over the mass.

5. The method of claim 1, wherein the forming the dielectric layer over the mass comprises laminating a dielectric film and the dielectric film comprises a final layer of a packaging of the accelerometer.

* * * * *

UNITED STATES PATENT AND TRADEMARK OFFICE
CERTIFICATE OF CORRECTION

PATENT NO. : 10,156,583 B2
APPLICATION NO. : 15/051856
DATED : December 18, 2018
INVENTOR(S) : Ma et al.

Page 1 of 1

It is certified that error appears in the above-identified patent and that said Letters Patent is hereby corrected as shown below:

On the Title Page

Item (54), in "Title", and in the Specification, In Column 1, Line 1, delete "MAKING" and insert --MANUFACTURING-- therefor Signed and Sealed this
Fourteenth Day of April, 2020

Andrei Iancu
*Director of the United States Patent and Trademark Office*